United States Patent [19]

Pence

[11] 4,369,048
[45] Jan. 18, 1983

[54] METHOD FOR TREATING GASEOUS EFFLUENTS EMITTED FROM A NUCLEAR REACTOR

[75] Inventor: Dallas T. Pence, 10665 Loire Ave., San Diego, Calif. 92131

[73] Assignee: Dallas T. Pence, San Diego, Calif.

[21] Appl. No.: 115,671

[22] Filed: Jan. 28, 1980

[51] Int. Cl.³ .................. 55 DIG. 9; C01B 23/00
[52] U.S. Cl. ............................. 55/66; 55/75; 62/18; 252/630
[58] Field of Search ............ 55/DIG. 9, 66, 75; 62/12, 18; 252/301.1 W, 630

[56] References Cited

U.S. PATENT DOCUMENTS

| | | | |
|---|---|---|---|
| 3,501,923 | 3/1970 | Lehmer | 55/66 |
| 3,806,583 | 4/1974 | Dewell | 55/66 |
| 4,012,490 | 3/1977 | Lofredo | 55/75 |
| 4,080,429 | 3/1978 | Koeppe | 55/66 |
| 4,088,737 | 5/1978 | Thomas et al. | 55/75 |
| 4,201,690 | 5/1980 | Mills | 55/66 |

*Primary Examiner*—Norman Yudkoff
*Attorney, Agent, or Firm*—Bruno J. Verbeck; Michael L. Slonecker

[57] ABSTRACT

A method is disclosed herein for treating the gaseous effluents emitted from a nuclear reactor, said method being adaptable for treating either gaseous effluents produced during normal reactor operations or combustible and fission product gases released as the result of a nuclear reactor system failure. The treatment comprises sequential direction of the gaseous mixture through a multiplicity of adsorbent beds, each of said beds being preferentially adsorptive towards at least one component of said gaseous mixture, whereby to effect the desired separation by substantially either thermal-swing, cryogenic, or rapid cycle adsorption techniques.

13 Claims, 3 Drawing Figures

METHOD FOR TREATING GASEOUS EFFLUENTS EMITTED FROM A NUCLEAR REACTOR

BACKGROUND OF THE INVENTION

During nuclear reactor operations, fuel cladding defects inevitably cause some fission product krypton and xenon gases to escape from the reactor fuel and become distributed throughout the various reactor gaseous effluents; the quantity and composition of these distributed gases depending upon the type of reactor utilized, the quality of the fuel, and the irradiation time. Inasmuch as these fission product gases are not completely soluble in the reactor coolant, some portions of the gas are available for release to the atmosphere. Thus, in order to limit the hazards of radiation exposure posed by these fission products to the public, various off-gas treatment systems for removing these products until their decay have been installed at nuclear power plants.

In boiling water reactor (BWR) systems, radiolysis of the cooling water in the reactor vessel generates gaseous hydrogen and oxygen. These gases, together with the fission product noble gases escaping from the fuel, are carried by process steam to the reactor's main condenser. This moisture laden gas mixture is then removed therefrom by a stream jet air ejector (SJAE) and directed to the off-gas effluents treatment system, such treatment systems, as discussed in R. J. Tossetti, "Gaseous Waste Treatment," Chapter 5, *Proposed American National Standard Gaseous Radioactive Waste Processing Systems for Light Water Reactor Plants*, ANS-55.8, N720, Draft 10, January, 1978, ranging from simple storage to cryogenic distillation.

All current BWR off-gas treatment systems have three common functions. First, hydrogen and oxygen from the SJAE exhaust are removed from the process steam by passing these gases through a catalytic recombiner, followed thereafter by removal of the process steam from the remaining off-gas effluents. Next, remaining residual water vapor is removed by a desiccant dryer or freeze-out exchanger.

Finally, most of the fission product gases present in the effluent stream are treated by separation therefrom, and then either stored in holding tanks to ensure decay of most of the radioactive components or delayed for a time sufficient to allow for decay to innocuous levels prior to atmospheric discharge.

Recombination of hydrogen and oxygen typically occurs in the presence of platinum/palladium-type catalysts with either a metallic or ceramic base, the off-gas hydrogen being diluted to keep its concentration at or below 4% by volume, the hydrogen hazardous limit in air, and to prevent excessive post-reaction temperatures within the recombiner unit.

The removal of residual moisture from the effluent stream, a desirable step in order that the adsorptive efficiency of the treatment system towards the fission product gases be increased, is achieved by passing the stream throught a parallel series of molecular sieve beds. When saturation of the on-line bed occurs, the flow is directed to an alternate bed and the saturated bed regenerated by passing heated air therethrough to desorb the retained moisture.

The final phase of a conventional treatment process comprises the use of charcoal beds to effect the removal of krypton and xenon from the effluent stream. The required hold up time (i.e., removal efficiency) of a charcoal bed is a function of gas flow rate, charcoal mass, and dynamic adsorption coefficient, approximated by the equation:

$$T = 0.53(MK/F)$$

where,
T = hold up time in hours
M = mass of charcoal adsorbent in tons
K = dynamic adsorption coefficient in $cm^2/gm$, and
F = gas flow rate in scfm.

Since dynamic adsorption coefficient inversely relates to operation temperature, various cooling system configurations are incorporated into effluent treatment system designs so as to reduce the quantity and volume of the charcoal adsorbent beds; however, such use is at the expense of significant increases in construction costs for the treatment system.

Unlike BWRs which utilize process steam to remove waste gases generated by reactor operations, pressurized water reactor (PWR) gaseous effluents are collected and removed by various vents and tanks within the reactor vessel, such vents and tanks including the gas stripper, reactor coolant, drain tank vent, equipment drain tank vent, chemical and volume control system hold up tank vent, and the volume control tank purge. Hydrogen gas generally represents approximately 70% of the total off-gas effluent stream.

The treatment system presently used in most PWRs is the waste gas decay tank system wherein fission product gases, collected from the several tanks and vents, are passed through a manifold prior to entry through a surge tank to allow for noncontinuous flow of the influent gas. The gas is subsequently directed to a compressor, the gas having previously been filtered to prevent particulates from building up in the compressor and causing damage. The compressed gas is then stored in one of several large decay tanks. Normally, one tank is being filled while two or more tanks are decaying in isolation and another tank is depressurized by releasing its contents to the atmosphere. The number and size of the decay tanks used is dependent upon several factors, the primary factor being the hold up time of the waste gas, typically 30 days, necessary to achieve the maximum permissible site boundary radioactive hazard limit.

An alternate method for PWR effluent treatment is by effecting the selective adsorption of fission product gases by means of an adsorbent charcoal bed. The effluent stream is first passed through an after-cooler to remove the heat of compression and lower the absolute humidity of the gas in order to ensure proper charcoal adsorbent bed performance. For gas flow rates typically associated with a PWR, approximately 3,000 pounds of charcoal are required for 30 days of xenon hold up.

The discussion thus far assumes, of course, normal system operation and circulation of cooling water throughout the reactor vessel. However, in the event of a loss-of-coolant accident such as that which recently occured at Three Mile Island (TMI-2), the loss of coolant and resultant heat rise in the fuel elements due to radioactive decay, may result in the breakdown of fuel integrity and subsequent rapid rate discharge of volatile and semi-volatile fission products. In such an overheated condition, zircaloy fuel cladding material reacts with any water present in the reactor or containment vessel to form hydrogen gas, several hundred cubic feet of which can be produced within a relatively short period of time. Additionally, the use of alkaline sprays to cool down the contaminated atmosphere within a containment vessel will also generate hydrogen gas due to reaction with various metallic parts therein.

The prior art has handled the problem of explosive risk presented by hydrogen gas formation during normal reactor operations by incorporating hydrogen recombiners into some of the various off-gas treatment systems designs, a not altogether satisfactory solution as a significant number of hydrogen explosions have occured as a result of such hydrogen-oxygen recombination step.

In the event of a reactor system failure, containment vessels are usually provided with either emergency hydrogen recombiners or venting arrangements for connecting the off-gas treatment system recombiner to the containment atmosphere whereby to remove hydrogen gas present therein.

Though the prior art has recognized the danger associated with hydrogen formation, none of the various reactor designs presently in use have included provision for controlling the venting of containment vessel atmospheres whereby to prevent the atmospheric release of radioactive noble gases generated as the result of a system failure.

Therefore, it is an object of the present invention to provide an integrated off-gas treatment system adaptable for treating either off-gas effluents produced during normal reactor operations or combustible and fission product gases released as the result of a nuclear reactor system failure.

A still further object is to effect the separation of hydrogen from the off-gas in a simple and safe manner which eliminates the need for a hydrogen recombiner, thereby reducing both the risk of hydrogen explosion and the overall cost of the off-gas treatment system.

Another object is to provide an off-gas treatment system adaptable for use with BWR, PWR, and other types of nuclear reactors.

And yet another object is to provide an off-gas treatment system wherein the majority of treatment steps are performed at or near ambient temperature and pressure.

SUMMARY OF THE INVENTION

The present invention relates to a means and method for the treatment of nuclear reactor off-gases produced by either normal reactor operations or as the result of a reactor system failure. In the manner hereafter described, hydrogen gas may be safely separated from the off-gas mixture and diluted, if necessary, to below the hydrogen hazardous limit in air. Additionally, the present invention further provides for the separation and retention of the various radioactive off-gases in a manner permitting either long term storage or hold up for a time sufficient to permit radioactive decay to innocuous levels prior to atmospheric discharge.

Briefly stated, the method of the present invention for treating nuclear reactor off-gases substantially comprises the steps of:

(a) removing residual water vapor and carbon dioxide by means of a zeolite-based molecular sieve drying bed using conventional adsorption-desorption techniques;

(b) removing radioiodine by means of silver-exchanged synthetic mordenite (AgZ);

(c) removing hydrogen and oxygen by means of a synthetic mordenite zeolite (hydrogen form) adsorbent bed using rapid cycle adsorption (RCA) to effect the removal;

(d) removing radioxenon by means of AgZ;

(e) delaying radioxenon atmospheric discharge a time sufficient to permit radioactive decay by means of a delay line containing AgZ; and (f) removing radiokrypton by means of AgZ using cryogenic adsorption whereby to permit long-term radiokrypton storage. With the exception of the radiokrypton removal step, all other steps in the process are performed at or near ambient temperatures and pressures.

Stated in further detail, the invention comprises passage of the off-gas effluents through a conventional pre-treatment system, discussed more fully in the Description of the Preferred Embodiment, the pre-treatment system depending upon the type of reactor involved. For example, a BWR pre-treatment system primarily comprises the removal of process steam from the stream of effluents. These pre-treated gases are thereafter directed to a zeolite based molecular sieve drying bed, the zeolite having a strong affinity toward water and carbon dioxide while at the same time not appreciably holding up the flow therethrough of the gaseous effluents.

The dried off-gas stream is next directed through an adsorbent bed of AgZ whereby to remove therefrom the radioiodine component. The off-gas stream, primarily comprising hydrogen, oxygen, air, radioxenon, and radiokrypton, is then passed through an adsorbent bed of hydrogen-form synthetic mordenite zeolite. I have found that with the use of the hydrogen form of mordenite, typified by the product known as Zeolon 900, manufactured by the Chemical Process Products Division, Norton Company, Akron, Ohio, and described in Bulletin Z50 of the company, hydrogen and oxygen will readily pass through the adsorbent while krypton and xenon are retained long enough to effect a separation using the well-known technique of rapid cycle adsorption (RCA). As the hydrogen rich gaseous mixture exits the adsorbent bed, it is immediately diluted, if necessary, with nitrogen or air to below the hydrogen hazardous limit in air, about 4%, prior to being discharged into the atmosphere.

With the RCA technique, three or more adsorbent columns of the synthetic zeolite are used in parallel, one in service and the other(s) in various stages of regeneration or standby. After the feed stream of off-gas effluents is switched to a standby column, the loaded column is given a short forward purge of nitrogen to remove any residual hydrogen. Then, nitrogen is used to back purge the adsorbed krypton and xenon to the xenon separation columns.

Xenon separation is achieved utilizing conventional thermal swing adsorption-desorption in the presence of an AgZ synthetic mordenite. The separated xenon is then desorbed by a back purge of heated dry nitrogen and directed through a delay line filled with a sufficient quantity of AgZ synthetic mordenite zeolite to ensure radioxenon retention during the time necessary for it to decay to innocuous concentration levels, approximately 30-45 days.

The off-gas stream following xenon removal contains an essentially pure mixture of radiokrypton and nitrogen gas. Krypton separation therefrom is accomplished by first cooling the off-gas stream within a liquid nitrogen-cooled heat exchanger to about −140° C. The cooled gas mixture is then passed through another AgZ adsorbent bed which has also been cooled to about −140° C., wherein the krypton and a minor portion of the nitrogen is adsorbed. Prior to krypton breakthrough through the discharge line from the adsorbent bed, the gas feed is switched to a standby parallel bed and the saturated bed is desorbed of krypton by heating said bed to about 100°–150° C. and back purging with heated dry nitrogen. The desorbed krypton is then cooled again to about −140° C. and passed through another, but smaller, adsorbent bed of AgZ cooled to about −140° C. wherein the krypton is caused to be concentrated. When the krypton concentration bed becomes sufficiently saturated, it is regenerated in a manner similar to the krypton separation adsorbent beds, and the recovered krypton collected in a liquid nitrogen-cooled freeze-out trap. In this manner the recovered krypton is concentrated still further whereby to permit collection of the krypton within long-term storage steel cylinders.

The present invention for radiokrypton and radioxenon retention is applicable to Light Water (LW) and other types of reactors although the process would be applied somewhat differently for the different reactors. There are also contemplated some slight modifications for each type of reactor depending upon the original off-gas treatment system design. However, the basic concept is applicable to all LWRs and other reactor off-gas treatment system designs. Still further, the method is adaptable for treating the various off-gases generated as the result of a reactor system failure.

BRIEF DESCRIPTION OF THE DRAWINGS

For a better understanding of this invention, reference is made to the accompanying drawings wherein like reference numerals refer to like parts throughout the several views; and wherein.

DETAILED DESCRIPTION OF THE PREFERRED EMBODIMENT

Basically, the present invention utilizes two steps for effecting the treatment of LWR, and other, off-gas effluents. As will hereafter be discussed more fully, the first step, which depends upon the type of reactor system used, comprises the preliminary treatment of the off-gas stream to either remove process steam or produce a steady state continuous flow through the system. Thereafter, the off-gas stream, primarily comprising hydrogen, oxygen, air, noble gases, and residual moisture, is sequentially directed through a series of adsorbent beds which, in order, separate and remove residual moisture and $CO_2$, remove radioiodine species, separate and remove oxygen and hydrogen, separate and delay atmospheric release of radioxenon for a time sufficient to permit radioactive decay, and separate and concentrate radiokrypton whereby to permit long-term storage.

Figure 1:
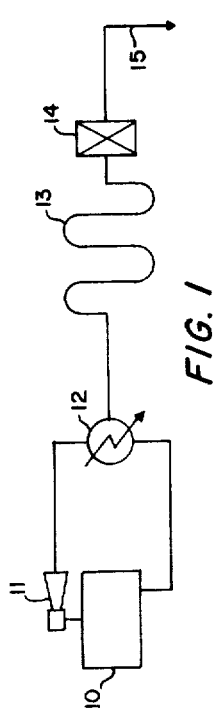
FIG. 1 is a diagrammatic view of a typical BWR effluent flow prior to treatment for effecting separation of the various off-gases.

With specific reference to the BWR off-gas effluent flow depicted in FIG. 1, radiolytically produced hydrogen and oxygen gas, along with fission product noble gases released from the reactor fuel, are carried by process steam to the main condenser 10. The gaseous mixture is removed therefrom by means of a stream jet air ejector (SJAE) 11, ejector 11 further serving the function of providing motive force to move the effluents stream through the treatment system. The stream of moisture laden gas is then directed from ejector 11 to a condenser 12, whereby the majority of process steam is removed and routed back to main condenser 10 to maintain the primary coolant water inventory. The off-gas effluents are then passed through a 10-to-30 minute delay line 13, permitting the decay of short-lived fission and activation product gases, a filter 14 to remove the particulate daughter products of noble gas isotopes, and thence via line 15 to the off-gas treatment system depicted in FIG. 3.

Figure 2:
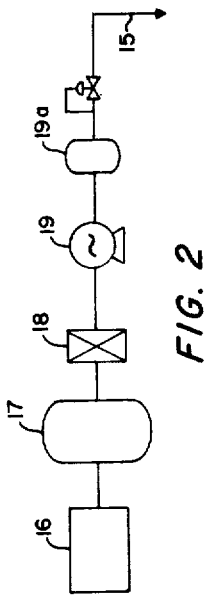
FIG. 2 is a diagrammatic view of a typical PWR effluent flow prior to treatment for effecting separation of the various off-gases.
Figure 3:
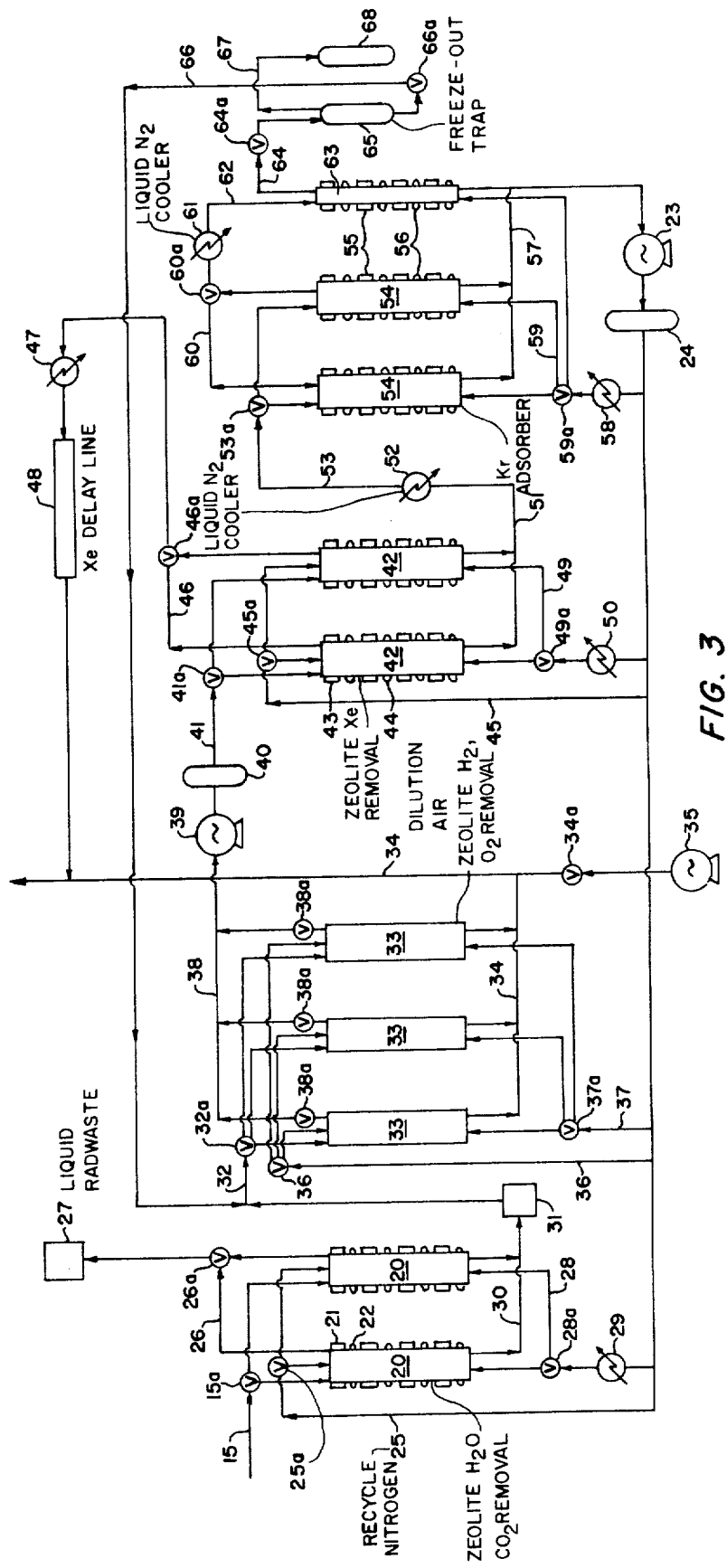
FIG. 3 is a diagrammatic view of the present invention adapted to treat the various off-gases generated during normal reactor operations.

Referring to FIG. 2, PWR fission product gases collected from the various reactor tanks and vents, collectively referred to as 16, pass into surge tank 17, then at a constant flow rate to compressor 19, filter 18 interposed therebetween to prevent particulates from building up and causing damage to compressor 19, and finally through a second surge tank 19a prior to entering the treatment system, shown in FIG. 3, via line 15.

Upon completion of the preliminary treatment depicted in FIGS. 1 and 2, or well-known variations thereof, the off-gas stream generated during normal reactor operation is directed through feed line 15 to the second stage of the integrated process diagrammatically represented by FIG. 3. For purposes of clarity in describing the manner by which the various separations are caused to occur, the multiplicity of steps contained therein will be discussed in the following order:

(a) water and carbon dioxide removal;
(b) radioiodine removal;
(c) hydrogen and oxygen removal;
(d) radioxenon removal; and
(e) radiokrypton removal.

Water and Carbon Dioxide Removal

Inasmuch as the affinity of zeolite to adsorb noble gases is adversely affected by the presence of residual moisture, it is desirable to preliminarily remove water down to about several ppm moisture. Therefore, at least two water and carbon dioxide removal columns 20, connected in parallel and adapted for sequential reception of the off-gas stream, are provided having disposed therethrough a quantity of Type 4A synthetic zeolite sufficient to adsorb water and carbon dioxide without appreciably coadsorbing the various other off-gas components. Secured about each column 20 are a plurality of electrically activated column clamp heaters 21 and cooling coils 22 which accelerate the time required for regeneration and return of a saturated column 20 back into standby ready for accepting and processing the off-gas stream.

The separation of water and carbon dioxide is obtained by utilizing conventional adsorption-desorption technology and occurs in the following manner. The various off-gases are first directed through feed line 15 into one of the columns 20 wherein the zeolite selectively adsorbs the water and carbon dioxide components. As the gas receiving column becomes saturated, valve 15a shifts the off-gas stream to a standby column 20, valve 25a is opened, and a forward purge of nitrogen, from the recycle nitrogen compressor 23 and surge tank 24 combination, is introduced via line 25 through the saturated column to hasten the removal therefrom of the non-adsorbed off-gas components. Valve 25a is then closed and heaters 21 activated. As the column is heated to desorption temperature, valve 26a is opened and the saturated column is connected via vent line 26 the liquid radwaste system 27. Alternatively, if the radiation levels of the collected water and carbon dioxide are sufficiently low to pose no environmental threat, the column undergoing regeneration may be vented directly to the atmosphere.

When the column 20 temperature reaches about 275° C., the back purge supply line 28 and valve 28a is opened and heated dry nitrogen, from heater 29, is introduced through the column. Immediately following desorption of the water and carbon dioxide, valve 26a is closed, the back purge terminated, and the column cooled back down to ambient temperature by cooling coils 22.

RADIOIODINE REMOVAL

The off-gas effluents from discharge lines 30 of columns 20 are next passed through a radioiodine removal bed 31 containing silver-exchanged zeolite (AgZ) whereby to remove any radioiodine species. Not withstanding that AgZ exhibits reduced adsorption efficiency when exposed to high concentration levels of hydrogen, it is nevertheless preferred as the adsorbent over impregnated charcoal inasmuch as the physical size of the bed is smaller, the adsorbent capacity is greater, and the bed is less susceptible to the deleterious effects of decay heat. Preferably, bed 31 is adapted for removal from the off-gas treatment system upon saturation with radioiodine and, therefore, no regeneration of bed 31 is necessary.

HYDROGEN AND OXYGEN REMOVAL

The off-gas effluents exiting the radioiodine removal bed 31 comprise primarily hydrogen, oxygen, air and noble gas. These various effluents are next directed via feed line 32 to a plurality of hydrogen and oxygen removal column 33, adapted for sequential operation, having disposed therethrough a sufficient quantity of hydrogen-form synthetic mordenite zeolite whereby to effect the physical separation of the noble gas components from the various off-gas effluents untilizing the technique of rapid cycle adsorption (RCA).

It should be understood that hydrogen and oxygen are removed at this state of the process for several reasons. As will later be discussed more fully, the subsequent process steps for separating the various noble gases from each other utilize silver-exchanged mordenite zeolite (AgZ) as the adsorbent material. Inasmuchas oxygen is adsorbed upon AgZ to some extent, thereby reducing its capacity to coadsorb noble gases, and further because AgZ has a tendency to become reduced when exposed to high concentration levels of hydrogen, it is preferred that hydrogen and oxygen be removed from the off-gas stream prior to effecting separation of the various noble gases. Additionally, the explosive hazard resulting from ozone formation is eliminated by preventing oxygen exposure to high concentrations of Krypton-85.

The gaseous composition exiting columns 33 through line 34 depends upon the reactor type and design, but the hydrogen concentration could be as high as 65-70% by volume. As the gaseous mixture containing the hydrogen exits column 33, air from an auxiliary compressor 35 can be used to dilute the gas mixture, if necessary, to bring it below the hydrogen hazardous limit in air, approximately 4% by volume, prior to atmospheric release. The amount of hydrogen coadsorbed and remaining with the noble gases is in the order of only a few ppm.

Because the hydrogen-form of the synthetic mordenite zeolite does not have a strong affinity towards krypton and xenon, it cannot be used to hold up these gases for more than a few minutes before breakthrough; therefore, the RCA technique is used for the separation. With this technique, at least two adsorbent columns 33 are used in parallel, one being in service while the other(s) is in various stages of regeneration or standby. After the off-gas stream through line 32 is switched by valve 32a to a standby column 33, valve 36a is opened, and the loaded column 33 is given a short forward purge of nitrogen through line 36 to remove residual hydrogen and oxygen. Immediately thereafter, valve 36a is closed, valves 37a and 38a (from the loaded column 33) opened, and a back purge of dry nitrogen from line 37 is introduced to desorb the adsorbed noble gases and direct them via line 38 to the next step in process. Not all of the noble gases are removed during the back purge step, and eventually traces of noble gas would break through the hydrogen and oxygen removal columns 33 and exit through line 34. To prevent this, the back purge cycle time may be doubled approximately every ten cycles. Alternatively, a third column 33 may be added whereby to allow for an extended purge cycle without interrupting continuous operation. The motive force for maintaining gas flow through column 33 is in the form of a low pressure blower 39 and surge tank 40 combination. Because of the gas adsorption and desorption, the only pressure drop through the off-gas treatment system is that caused by the various valves, lines, and adsorbent beds, such pressure drops being in the range of only a few inches of water if properly designed. Further, blower 39 is located downstream of the hydrogen and oxygen removal columns 33 to allow for continuous operation without the danger that the blower 39 will cause ignition of combustible off-gas components.

RADIOXENON REMOVAL

The off-gas stream exiting from surge tank 40 through line 41 primarily comprises an enriched mixture of radioxenon, radiokrypton, and nitrogen. To effect the separation therefrom of the radioxenon component, at least two radioxenon removal columns 42 connected in parallel and adapted for sequential reception of the off-gas stream, are provided. Secured to each column 42 are a plurality of electrically activated column clamp heaters 43 and cooling coils 44 which accelerate the time required for regeneration and return of a saturated column 42 back into standby ready for accepting and processing the off-gas stream.

The adsorbent material utilized for radioxenon removal is silver-exchange synthetic mordenite zeolite (AgZ), which exhibits a high affinity for adsorbing xenon even at near ambient temperatures. Briefly, the adsorbent is prepared from a base material purchased from the Chemical Process Products Division, Norton Company, Akron, Ohio, and described in Bulletin Z50 of that company as Zeolon 900, hydrogen form. The Zeolon 900 material is a zeolite material composed of sodium alumino silicates. The hydrogen form is that in which the sodium cations have been replaced by hydrogen ions. These zeolon material were received as ⅛ in. diameter by ¼ to ⅜ in. long extrudate pellets. The material was ground and sieved to obtain an approximate gaussion particle distribution size in the range of 10 to 20 ym. in diameter. The ground material is then water-washed and batch-wise exchanged with the 1 M silver nitrate solution. Several exchanges were formed per batch until the silver-exchanged zeolite was about 15% by weight silver. After the adsorbent columns were filled with the material, they were activated by heating to 250° to 300° C. for at least 4 hours with a slow purge of dry oxygen. At the conclusion of the heat treatment, the adsorbent beds were cooled with a purge stream of dry nitrogen.

The separation of radioxenon is obtained by utilizing conventional adsorption-desorption technology and occurs in the following manner. The various off-gases are first directed from line 41 by valve 41a into one of the columns 42 wherein the Agz selectively adsorbs the radioxenon. As the gas receiving column becomes saturated, valve 41a shifts the off-gas stream to the standby column 42, valve 45a is opened, and a forward purge of nitrogen is introduced via line 45 through the saturated column to hasten removal therefrom of the non-adsorbed off-gas components. Valve 45a is then closed and heater 43 is activated. As the column is heated to desorption temperature, valve 46a is opened to connect the saturated column vent line 46 with the radioxenon delay line 48, the operation of which will be discussed hereafter.

When the saturated column 42 reaches desorption temperature, the back purge supply line 49 valve 49a is opened and heated dry nitrogen, from heater 50, is introduced through the column. Immediately following desorption of the radioxenon, valve 46a is closed, the back-purge terminated, and the column cooled back down to ambient temperature by cooling coils 44.

The desorbed radioxenon/nitrogen enriched mixture is then passed through a water-cooled heat exchanger 47 whereby to cool the gas back down to about ambient temperature. Immediately thereafter, the xenon/nitrogen mixture is introduced into a radioxenon delay line 48 having disposed therethrough a quantity of AgZ sufficient to retain the adsorbed radioxenon for approximately 30 to 45 days, thereby to permit radioxenon isotope decay to innocuous levels prior to atmospheric release. Because the volume of the adsorbed radioxenon is so small, in the order of a few thousand parts per million, and further because the desorption gas flow of radioxenon is similarly small, column dimensions for the radioxenon delay line 48 are significantly reduced.

RADIOKRYPTON REMOVAL

Passing through discharge line 51 from the radioxenon removal columns 42 is an enriched mixture of radiokrypton and nitrogen. Separation of the radiokrypton component is performed by first passing the enriched mixture through a liquid nitrogen-cooled heat exchanger 52 whereby to reduce the temperature from ambient down to about −140° C. The gas is next directed via line 53 through one of at least two radiokrypton removal columns 54 having disposed therein AgZ maintained at an adsorbent bed temperature of about −140° C. by liquid nitrogen-cooled cooling coils 56. At or about this temperature the radiokrypton is retained within the adsorbent interstitial voids while the majority of the nitrogen carrier gas passes readily therethrough and is discharged via line 57 for storage within surge tank 24.

As the gas receiving column 54 becomes saturated, valve 53a shifts feed line 53 to a standby column 54, column clamp heaters 55 are activated, valve 60a opened, and the adsorbent bed temperature raised to about 100° C. whereby to desorb the retained radiokrypton. Concurrently, valve 59a is opened and heater 58 is utilized to introduce heated dry nitrogen through back purge line 59 into the saturated column 54.

The desorbed radiokrypton and nitrogen purge gas is again passed via line 60 through a liquid nitrogen-cooled heat exchanger 61, re-cooled down to about −140° C., and then directed via line 62 to a radiokrypton concentration column 63 substantially identical in construction and manner of operation to the radiokrypton removal columns 54. Because column 63 receives feed gas only during the desorption of a radiokrypton removal column 54, it is physically smaller and only one column 63 is required to effect radiokrypton concentration.

Preferably, column 63 is of a size sufficient to receive two or more desorption cycles from removal columns 54 before it becomes saturated with radiokrypton. Desorption of radiokrypton therefrom is performed in a manner substantially identical to that of the removal columns 54, and the desorbed radiokrypton is then directed via line 64 to a freeze-out trap 65 cooled to liquid nitrogen temperature. By slightly pressurizing trap 65, the radiokrypton will condense out while the nitrogen carrier gas will remain in the vapor state. Even at liquid nitrogen temperature, the noncondensed gas will contain an appreciable amount of radiokrypton; therefore, the noncondensed nitrogen and radiokrypton mixture is recycled via line 66 back to the hydrogen and oxygen removal columns 33 feed line 32.

Freeze-out trap 65, containing 75-90% radiokrypton, is then periodically sealed, heated to ambient temperature, and vented via line 67 to storage cylinders 68 whereby to provide for the long-term storage of radiokrypton.

Figure 4:
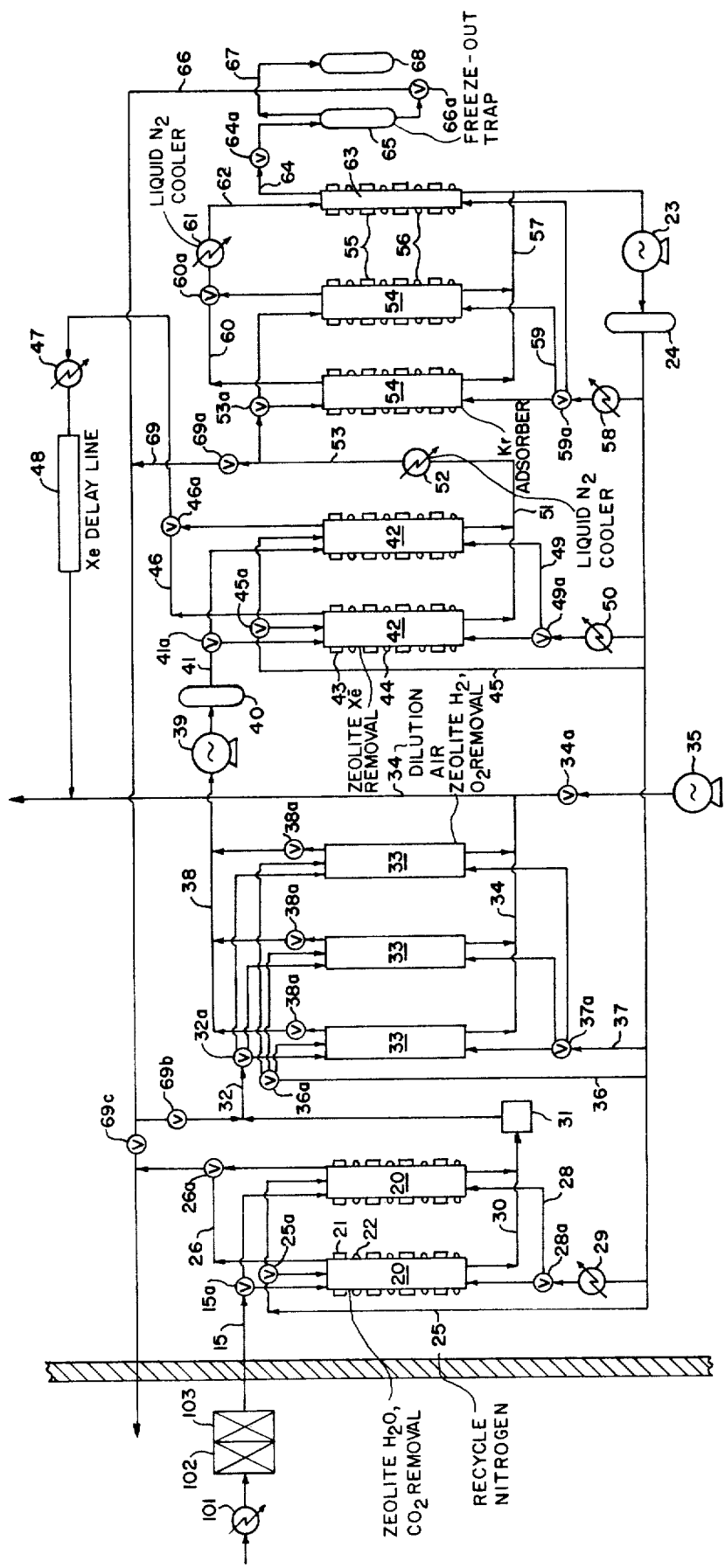
FIG. 4 is a diagrammatic view of the present invention adapted to treat the various off-gases generated as the result of a reactor system failure.

Coming now to FIG. 4, therein is shown a diagrammatical view of the present invention adapted for treating the off-gases released within a containment building 100 atmosphere as the result of a reactor system failure. To effect treatment of the contaminated atmosphere, the various off-gases are first cooled by a condenser 101 to about 30°–35° C. whereby to remove excess moisture, and then passed through a prefilter 102 and HEPA filter 103 to remove airborne particulates. Thereafter, the separation of the various off-gas components is performd in the manner herebefore described.

Assuming that the present invention is to be used only in the event of a reactor system failure, it would be impractical to maintain the various radiokrypton removal and concentration components at the low temperatures required. Therefore, to prevent release of radiokrypton in the event of an emergency startup, the radiokrypton recovery portion of the off-gas treatment system can be by-passed and all gases exiting the last step of the process, i.e., the radioxenon removal columns 42, would be recycled back to the containment building 100 via lines 66 and 69 until such time as the proper operating temperature for radiokrypton removal is obtained. If liquid nitrogen is readily available, such a delay would be in the order of a few hours.

By way of illustration, and to more fully comply with the disclosure requirements set forth in 35 USC 112, the following example is provided so that the process of my invention may be more readily understood. Based upon my experimental data, the following typical design data applies:

1. BWRs.

Assuming typical 1,100 MWe BWR normal operational off-gas flows:

| Component | Flow Rate Nm$^3$/min (scfm) |
|---|---|
| Hydrogen | 4.25 (150) |
| Oxygen | 2.12 (75) |
| Air in-leakage | 1.13 (40) |
| Water vapor | saturated |
| Noble gas | trace |
| Iodine | trace |
| Activation gases | trace |
| Total | 7.50 (265) + water vapor |

Cooler-Condenser:
Sufficient to cool to a dew point of at least 35° C. (95° F.)
Water and Carbon Dioxide Removal Columns:
1 m. dia. by 2 m. long (3 ft. dia by 6 ft. long)
Adsorbent—Type 4A molecular sieve
Cycle times—loading, 12 h; desorption (250° C.) and cooling 6 h; standby, 6 h.
Hydrogen and Oxygen Removal Columns:
1.25 m. dia. by 2.5 m. long (4 ft. dia. by 8 ft. long)
Adsorbent—synthetic mordenite (H-form Zeolon 900)
Cycle times—rapid cycle adsorption—2.5 min. loading, 0.5 min. forward purge; 3 min. back purge. About every 10 cycles, apply a 6 min. back purge.
Radioxenon Removal Columns:
1.4 m. dia. by 1.9 m. long (4.5 ft. by 6 ft. long)
Adsorbent—silver-exchanged synthetic mordenite
Cycle times-12 h loading; desorption (150° C.) and cooling, 8 h.
Radioxenon Delay Line:
20 cm. dia. by 10 m. long (8 in. dia. by 33 ft. long)
Adsorbent—silver-exchanged synthetic mordenite
Cycle times—semicontinuous, no regeneration necessary
Radiokrypton Removal Columns:
1.4 m. dia. by 2.5 m. long (4.5 ft. by 8 ft. long)
Adsorbent—silver-exchanged synthetic mordenite
Cycle time—8 h. loading; desorption (100° C.) and cooling, 8 h.
Radiokrypton Concentration Columns:
0.3 m. dia. by 1.25 m. long (1 ft. dia. by 4 ft. long)
Adsorbent—silver-exchanged synthetic mordenite
Cycle time—intermittent loading; 2 krypton separation column desorptions per cycle; desorption (100° C.) and cooling cycle, 4 h.

2. PWRs.

The off-gas flows from 1,100 MWe PWRs vary considerably depending on the design and state of operation. When the primary coolant is being continuously degassed, the flow rate ranges from 0 to 0.04 Nm$^3$/min (0 to 1.4 scfm) with the average being about 0.007 Nm$^3$/min (0.25 scfm). The gas flow rates from the drain tank vents are intermittent and vary from 0 to 0.6 Nm$^3$/min (0 to 20 scfms). Because of the large variation of flows, a compressor and holding tank is usually employed to levelize the flow to the off-gas treatment system. Therefore, a typical maximum normal flow rate would be about 0.03 Nm$^3$/min (1 scfm). The hydrogen concentration in the off-gas can vary from a few percent to about 70%. A system sized to handle 0.03 Nm$^3$/min (1 scfm) would be:

Water Adsorbent Columns:
10 cm. dia. by 2 m. long (4 in. dia. by 6 ft. long)
Adsorbent—Type 4A molecular sieve
Cycle times—6 h load, 6 h desorption and standby
Hydrogen-Oxygen Removal Columns:
10 cm. dia. by 2.5 m. long (4 in. dia. by 8 ft. long)
Adsorbent—Synthetic mordenite (hydrogen form)
Cycle time—2.5 min. loading; 0.5 min. purge, 3 min. pack purge, with a 6–10 min. prolong back purge every 10–20 cycles.
Radioxenon Removal Columns:
12 cm. dia. by 2 m. long (5 in. dia. by 6 ft. long)
Adsorbent—silver-exchanged synthetic mordenite
Cycle time—12 h loading; desorption (150° C.) and cooling, 12 h.
Radioxenon Delay Line:
8 cm. dia. by 10 m. long (3 in. dia. by 33 ft. long)
Adsorbent—silver-exchanged synthetic mordenite
Cycle time—semicontinuous; no regeneration necessary
Radiokrypton Removal Columns:
12 cm. dia. by 25 m. long (5 in. dia. by 8 ft. long)
Adsorbent—silver-exchanged synthetic mordenite
Cycle times—8 h loading; desorption (100° C.) and cooling, 8 h.
Radiokrypton Concentration Columns:
8 cm. dia. by 1.25 m. long (3 in. dia. by 4 ft. long)
Adsorbent—silver-exchanged synthetic zeolite
Cycle time—intermittent loading; 2 krypton removal columns desorption per cycle; desorption (100° C.) and cooling cycle, 4 h.

3. Containment Atmosphere Treatment System.

The exact dimensions for the equipment for such a system would depend on the perceived needs, but it is likely that the desired capacity for such as process would be very similar to that designed for the BWR off-gas treatment system.

A number of experiments were carried out to determine and identify those adsorbent materials that would selectively remove noble gases from normal off-gas constituents such as nitrogen and oxygen. The initial screening tests were carried out with the use of a gas chromatograph and a small column (5 mm. id by 20 to 60 cm. long) packed with an adsorbent ground to 40/60 mesh. A summary of this data is set out below in Examples 1 through 6.

Example 1. Adsorbent Screening Tests

| Test Conditions: | |
|---|---|
| Column Dimensions: | 5 mm. ID × 20 cm. long, stainless steel tubing packed with 40–60 mesh adsorbent |
| Column Temperature: | 25 to 28° C. |
| Carrier Gas: | N$_2$ (99.99% pure) |
| Flow Rate: | 0.53–0.56 cm$^3$/sec. |
| Face Velocity: | 1.7–1.8 m/min. |

| | Typical Retention Time[a] (min.) | |
|---|---|---|
| Adsorbents | Kr | Xe |
| HZ | 1.7 | 9.0 |
| AgZ | 6.2 | 376.00 |
| NaZ | 0.7 | 0.7 |
| KZ | 1.2 | 6.0 |
| CsZ | 1.9 | 12.0 |
| RbZ | 2.1 | 13.0 |
| CdZ | 0.7 | 0.7 |
| PbZ | 0.7 | 0.7 |

-continued

Test Conditions:
Column Dimensions: 5 mm. ID × 20 cm. long, stainless steel tubing packed with 40–60 mesh adsorbent
Column Temperature: 25 to 28° C.
Carrier Gas: $N_2$ (99.99% pure)
Flow Rate: 0.53–0.56 cm$^3$/sec.
Face Velocity: 1.7–1.8 m/min.

| Adsorbents | Typical Retention Time[a] (min.) | |
|---|---|---|
| | Kr | Xe |
| FeZ | 2.9 | 20.0 |

[a] Time between sample injection and peak maximum.

Example 2. Temperature Dependence Tests

Adsorbent: AgZ
Test Conditions:
Columns: Same as Example 1
Carrier Gas: $N_2$ (99.99% pure)
Flow Rate: 0.53–0.56 cm$^3$/sec
Face Velocity: 1.7 m/sec

| Temperature (°C.) | Retention Time (min) | |
|---|---|---|
| | Kr | Xe |
| 26 | 6 | 300 |
| 0 | 11 | 500 |
| −37 | 25 | |
| −58 | 36 | |
| −84 | 60 | |
| −122 | 132 | |

Example 3. Dynamic Loading Capacity Tests For Xenon

Adsorbent: AgZ
Test Conditions:
Column Dimensions: Same as in Example 1
Column Temperatures: 27° C.
Feed Gas: Xe - 0.27%
 Kr - 0.024%
 $N_2$ - Balance
Loading Capacity (g/gAgZ): Xe: 0.07
 Kr: 5 × 10$^{-5}$
Decontamination Factors (DFs): The DFs obtained for xenon and krypton during these experiments were > 10$^4$ and > 2 × 10$^3$, respectively

Example 4. Test For Oxygen Interference

Adsorbent: AgZ
Test Conditions:
Column Dimensions: Same as in Example 1
Column Temperature: 27° C.
Carrier Gas: $N_2$ (99.99% pure)
Flow Rate: 0.56 cm$^3$/sec.
Face Velocity: 1.7 m/min.

| Treatment With $O_2$ | Retention Time of Xe (min) |
|---|---|
| None | 170 |
| Xe injection was accompanied by separate $O_2$ injections: 5.4 × 10$^{-4}$ moles and 9.0 × 10$^{-4}$ moles before and after Xe injection, respectively. | 174 |

Example 5. Krypton Breakthrough, Decontamination Factor and Sweep Time Measurements Adsorbent: AgZ
Test Conditions:
Column Dimensions: Same as Example 1
Feed Gas: 200 ppm Kr in air
Sweep Gas: $N_2$ (99.99%) pure)
Column Temperature: Ambient (25° C.)
Pressure At Column Outlet: Atmospheric

| Actual Face Velocity (m/min) | Kr Breakthrough[a] Time (min) | Kr DF | $O_2$ Sweep[c] Time (min) |
|---|---|---|---|
| 1.8 | 1.2 | 140 | 1.9 |
| 5.4 | 6.5 | 160 | 1.0 |
| 8.5 | 4.4 | 140[b] | 0.8 |
| 17.0 | 2.0 | 150 | 0.6 |
| 8.5 | 4.0 | 220[b] | 0.7 |
| 8.5 | 4.0 | 170[b] | 0.7 |

[a] Oxygen breakthrough time at this face velocity was 0.5 min.
[b] Because of the short and rapid sample times, krypton retention in the sample lines and residual amount in spectrometer did not allow more accurate DF measurements.
[c] Time for oxygen concentration to decrease to 1% of its original concentration.

Example 6. Hydrogen-Oxygen Separation Using Rapid Cycle Adsorption

Adsorbent: Synthetic Mordenite (Zeolon 900) hydrogen form
Test Conditions:
Column Dimensions: 0.5 cm ID by 60 cm long
Feed Gas Composition: 900 ppm Xe
 80 ppm Kr
 3.3% $N_2$
 30% $O_2$
 66% $H_2$
Purge Gas: Dry Air
Column Temperature: 34° C.
Face Velocity: 4 m/min (13 ft/min)
Breakthrough Time: Kr - 3 min.
 Xe - 23 min.
Cycle Sequence: load - 2 min.
 forward purge - 0.5 min.
 back purge - 3.5 min
Decontamination Factors (DFs): Kr > 200[a]
 Xe > 300[a]

[a] Actual DF determinations were limited by analytical instrumentation sensitivities In the case of AgX, the percent of silver in the exchanged product varied from about 15 to 18%, the maximum theortical amount being 23%. The effectiveness of the noble gas retention on the AgZ depends upon the base material used in the exchange, and also on the degree of activation or dehydration. There are, of course, two types of base materials available for exchange: a sodium form and a hydrogen form. The AgZ which is prepared from the hydrogen from of synthetic mordenite is more effective for retaining xenon than is that which is prepared from the sodium form of AgZ, especially with regard to the absorption peak shape which is necessary for clean separation.

The exposure of the AgZ to high concentrations of hydrogen, namely greater than about 10%, rapidly reduced the exchanged silver to the free metal which adversely affects it capability to retain xenon and krypton and this, added to the desirability of removing the hydrogen from a safety standpoint, led to the development of the technique for separating hydrogen from the off-gas stream.

The hydrogen form of the synthetic mordenite was found to perform the separation adequately. Other metal-exchanged adsorbents may effect a better separation but may become reduced and lose their effectiveness. The adsorbent bed must remove and retain the xenon and krypton from the hydrogen rich off-gas without coadsorbing the hydrogen. The absorbent must not only retain xenon and krypton from the bed while the residual hydrogen and oxygen are purged from the bed, but also allow desorption with a minimum quantity of purge gas. This is done with a technique called rapid cycle absorption (RCA), similar to the art known processes referred to as "pressure swing absorption" and "heatless adsorption." These are processes which are commonly used industrially for the purification of hydrogen and for the separation of oxygen from air.

Because the radioactive kyrpton and xenon must be recovered essentially quantitatively, the absorption-desorption processes are performed slightly differently than with other rapid cycle adsorption processes.

Krypton, xenon and nitrogen are adsorbed more tenaciously than are oxygen and hydrogen, and in fact, hydrogen shows no tendency to absorb on the absorbent column. Unlike the case with the silver-exchanged synthetic mordenite, krypton and xenon adsorb only slightly on the synthetic mordenite absorbent, but will be retained for some minutes depending upon the length of the adsorbent and somewhat on the lineal face velocity of the feed gas.

After the krypton and mordenite have "chromatographed" about ½ the length of the column, which takes about several minutes for a 2.5 meter long column with a feed gas face velocity for about 6 meters/min, the feed stream is shifted to another column; the residual hydrogen is then swept from the bed with purged gas in the forward direction for about 30 seconds at the same face velocity, and the xenon is back purged with purge gas for a few minutes, at about twice the feed gas face velocity. The purged gas is dry nitrogen, and it is recycled after the removal of xenon and krypton on beds of AgZ.

The separated hydrogen, oxygen and some nitrogen, are then discharged to the ventilation system. The recovered xenon is then passed through an AgZ containing delay line. The entire cycle is then repeated. Not all of the xenon is removed from the purge step and eventually traces of xenon would have a tendency to break through the outlet of hydrogen separation bed. To prevent this, the back purge cycle time is doubled about every 10 to 20 cycles or so, and this is way three separation beds are used for continuous operation.

Dry nitrogen is used as the purge gas to eliminate the reintroduction of oxygen in the product krypton. This is done because ozone is a known radiolysis product of oxygen when exposed to high levels of radiation. Further, ozone is known to be unstable under certain conditions and could represent an explosive hazard.

Because most zeolites absorb water quite readily, and heat is required to remove the water, the xenon removal beds are preceded by absorption beds which are filled with a type 4A zeolite, another synthetic zeolite, that readily absorbs water and carbon dioxide, but does not retain hydrogen, krypton or xenon.

The above-described process eliminates the need for a hydrogen recombiner which has been a nemesis in the nuclear reactor industry. Also, because the AgZ, which is used as the adsorbent to hold up the xenon, has a retention time of about 10 times greater than that for activated carbon, smaller volumes are required to effect the desired hold up time.

In view of all of the above, it is evident that the several objects of the invention are achieved and various other advantageous results attained.

Since various changes can be made in the above-described invention without departing from the scope of the invention, it is intended that all matter contained in the above-description be interpreted as illustrative and not in a limiting sense.

What is claimed is:

1. In a process for treating the gaseous effluent emitted from a nuclear reactor, said effluent comprising hydrogen in gaseous admixture with krypton and xenon, a method for separating the hydrogen component of said gaseous effluent, comprising the step of directing said effluent through a column having absorbent material disposed therethrough and while maintaining said effluent at no greater than about ambient temperature and at about ambient pressure, said absorbent material comprising a synthetic mordenite zeolite.

2. A method as set forth in claim 1 wherein said effluent further comprises oxygen whereby to effect the simultaneous separation from said effluent of hydrogen and oxygen.

3. In a process for treating the gaseous effluent emitted from a nuclear reactor, said effluent comprising oxygen in gaseous admixture with krypton and xenon, a method for separating the oxygen component of said gaseous effluent, comprising the step of directing said effluent through a column having absorbent material disposed therethrough and while maintaining said effluent at not greater than about ambient temperature and at about ambient pressure, said adsorbent comprising a synthetic mordenite zeolite.

4. A method as set forth in claim 3 wherein said adsorbent material comprises hydrogen-form synthetic mordenite zeolite.

5. A method for treating gaseous effluents emitted from a nuclear reactor, comprising sequentially:
   (a) directing said effluents through an adsorbent bed adsorptive to water vapor and carbon dioxide, but not to xenon and krypton, forward purging said bed with purge gas in the direction of effluents flow, raising the temperature of said bed sufficiently to desorb the absorbed water vapor and carbon dioxide, and back purging said bed with heated purge gas whereby to remove from the bed the desorbed water vapor and carbon dioxide;
   (b) removing iodine from the resulting water-and-carbon dioxide-free effluent; and
   (c) directing the resulting effluent at not greater than about ambient temperature and at about ambient pressure through an absorbent bed comprising synthetic mordenite zeolite having an affinity for absorbing xenon and krypton which is greater than its affinity for adsorbing hydrogen and oxygen, forward purging said bed with purge gas in the direction of effluent flow to remove residual hydrogen and oxygen from said bed, and then back purging said bed with purge gas whereby to remove xenon and krypton from said bed.

6. The method of claim 5 wherein the purge gas is nitrogen.

7. The method of claim 5 which includes the additional step of directing the effluent resulting from step (c) through an adsorbent bed which comprises silver-exchanged mordenite zeolite whereby to adsorb xenon and krypton thereon.

8. The method of claim 5 containing the additional steps of directing the effluent from step (c) to a second adsorbent bed comprising synthetic mordenite zeolite whereby to concentrate the xenon and krypton thereon, then removing the xenon and krypton therefrom, and then directing that resulting effluent to an adsorbent bed comprising silver-exchanged synthetic mordenite zeolite, said additional steps being carried out a substantially ambient pressure.

9. The method of claim 5 containing the additional steps of directing the effluent from step (c) to an adsorbent bed of silver-exchanged mordenite zeolite whereby the xenon is absorbed and remains on the bed, while a substantial part of the krypton passes through the bed, then forward purging the bed with a purge gas whereby to remove remaining krypton from said bed at ambient temperature.

10. The method of claim 9 containing the added steps of directing the krypton which has been removed from said bed to an adsorbent bed of synthetic mordenite zeolite at less than ambient temperature to concentrate the krypton thereon.

11. In a process for treating the gaseous effluent emitted from a nuclear reactor, said effluent comprising hydrogen in gaseous admixture with krypton and xenon, a method for separating the hydrogen component of said gaseous effluent, comprising the step of directing said effluent through a column having hydrogen-form synthetic mordenite zeolite disposed therethrough and while maintaining said effluent at no greater than about ambient temperature and at about ambient pressure.

12. In a process for treating the gaseous effluent emitted from a nuclear reactor, said effluent comprising hydrogen and oxygen in gaseous admixture with krypton and xenon, a method for simultaneously separating the oxygen and hydrogen components from said gaseous effluent, comprising the step of directing said effluent through a column having adsorbent material disposed therethrough and while maintaining said effluent at no greater than at about ambient temperature and at about ambient pressure, said adsorbent material comprising hydrogen-form synthetic mordenite zeolite.

13. A method for treating gaseous effluents emitted from a nuclear reactor, comprising sequentially:
(a) directing said effluents through an adsorbent bed adsorptive to water vapor and carbon dioxide, but not to xenon and krypton, forward purging said bed with purge gas in the direction of effluents flow, raising the temperature of said bed sufficiently to desorb the absorbed water vapor and carbon dioxide, and back purging said bed with heated purge gas whereby to remove from the bed the desorbed water vapor and carbon dioxide;
(b) removing iodine from the resulting water-and-carbon dioxide-free effluent; and
(c) directing the resulting effluent at not greater than about ambient temperature and at about ambient pressure through an adsorbent bed comprising hydrogen-form synthetic mordenite zeolite having an affinity for adsorbing xenon and krypton which is greater than its affinity for adsorbing hydrogen and oxygen, forward purging said bed with purge gas in the direction of effluent flow to remove residual hydrogen and oxygen from said bed, and then back purging said bed with purge gas whereby to remove xenon and krypton from said bed.

* * * * *